United States Patent Office 3,024,644
Patented Mar. 13, 1962

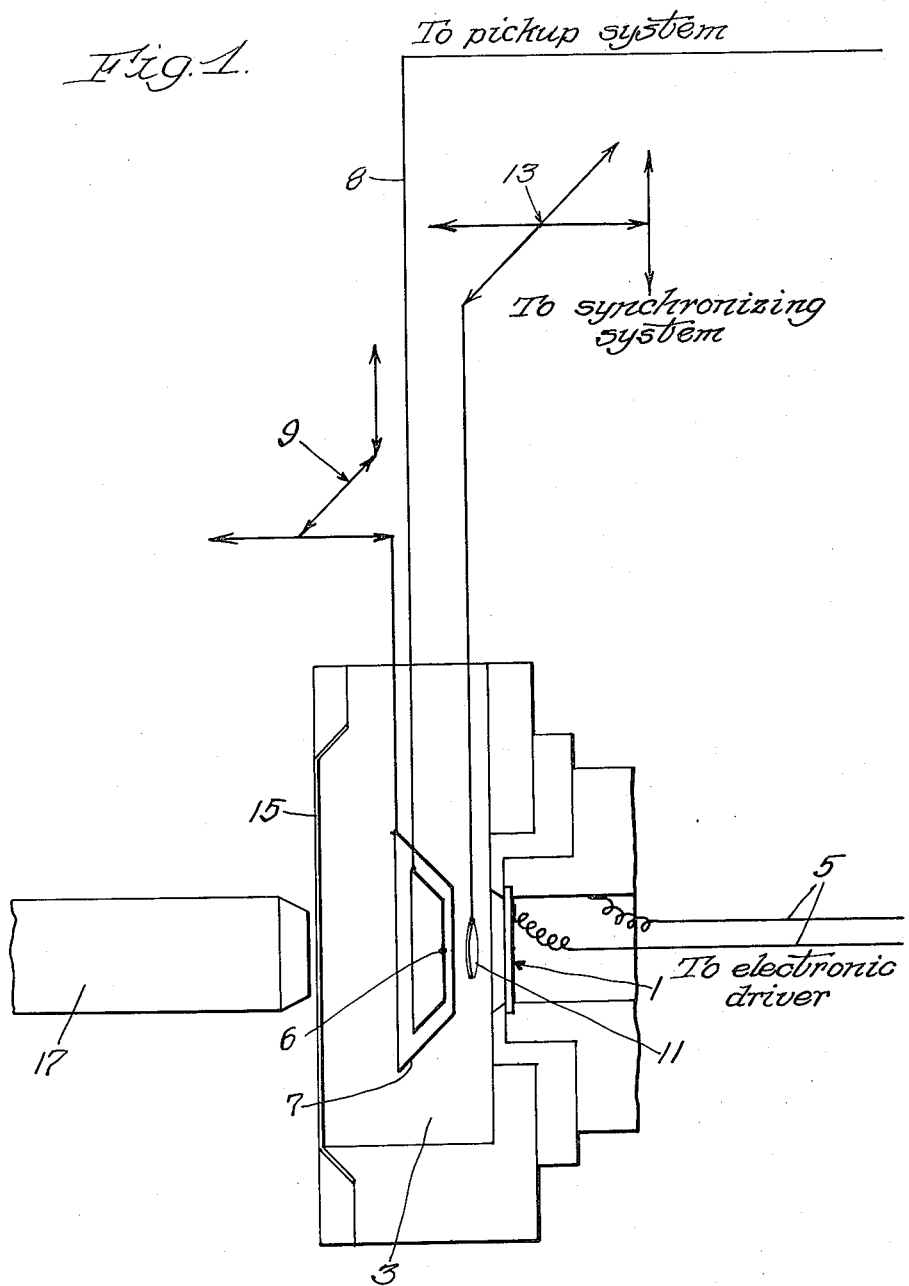

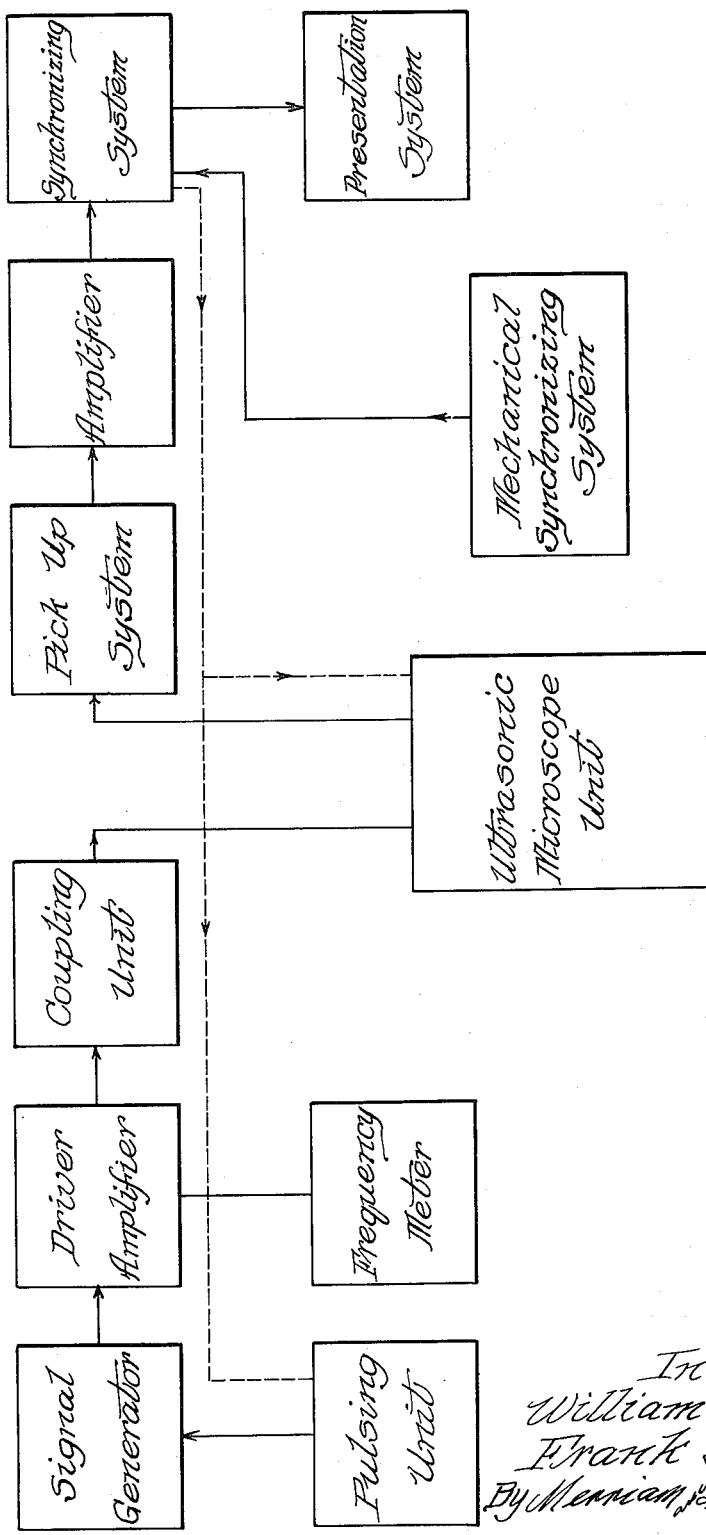

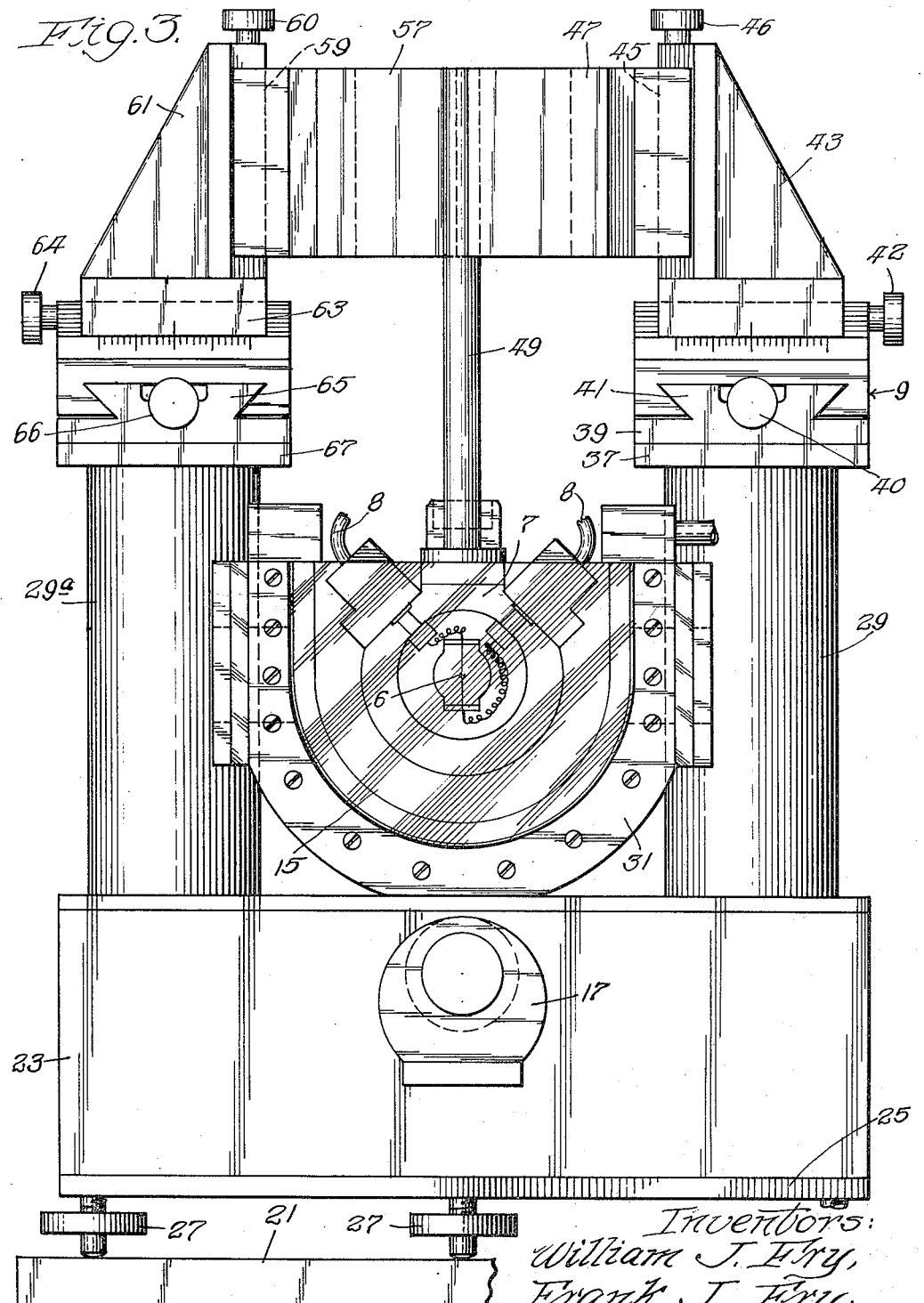

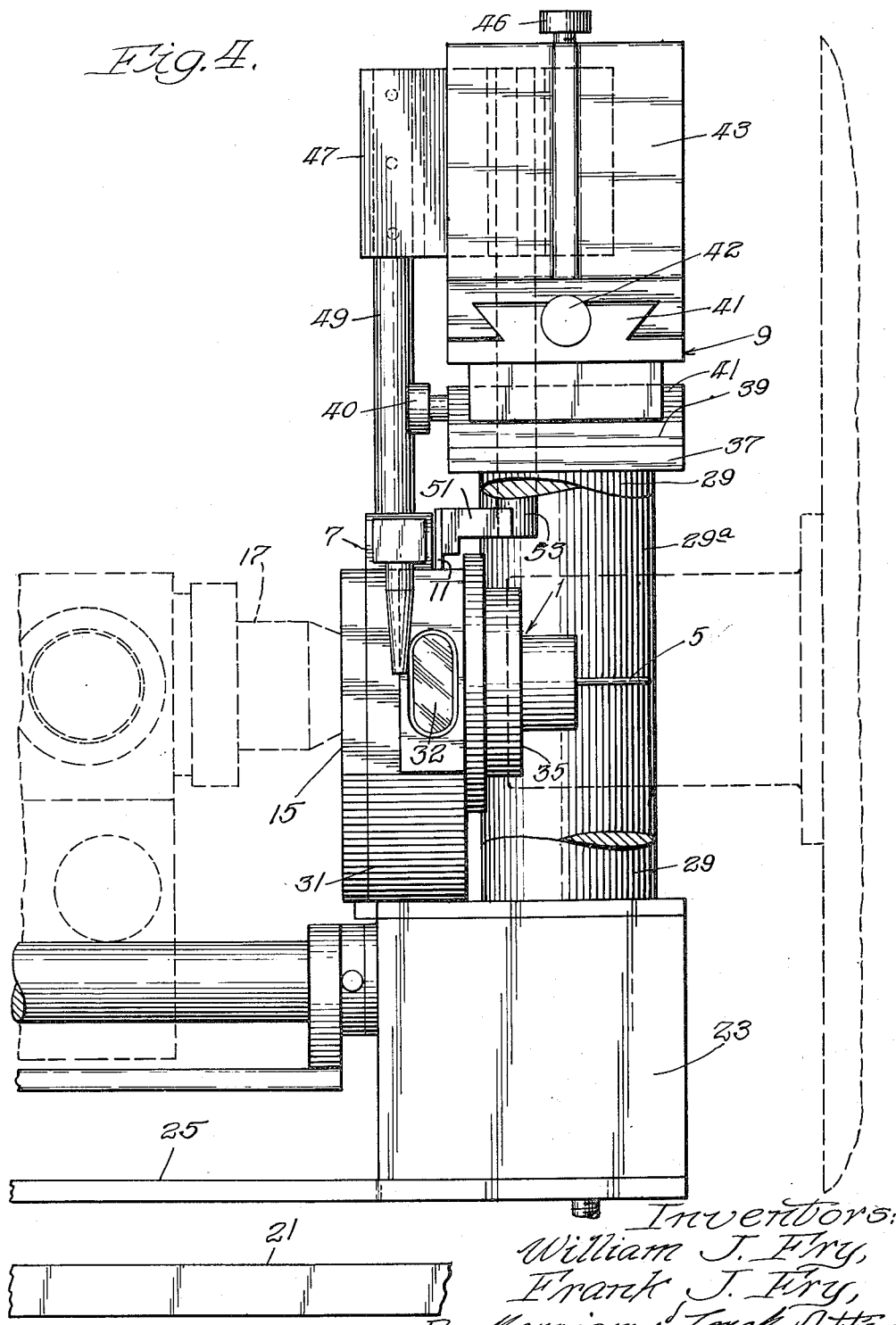

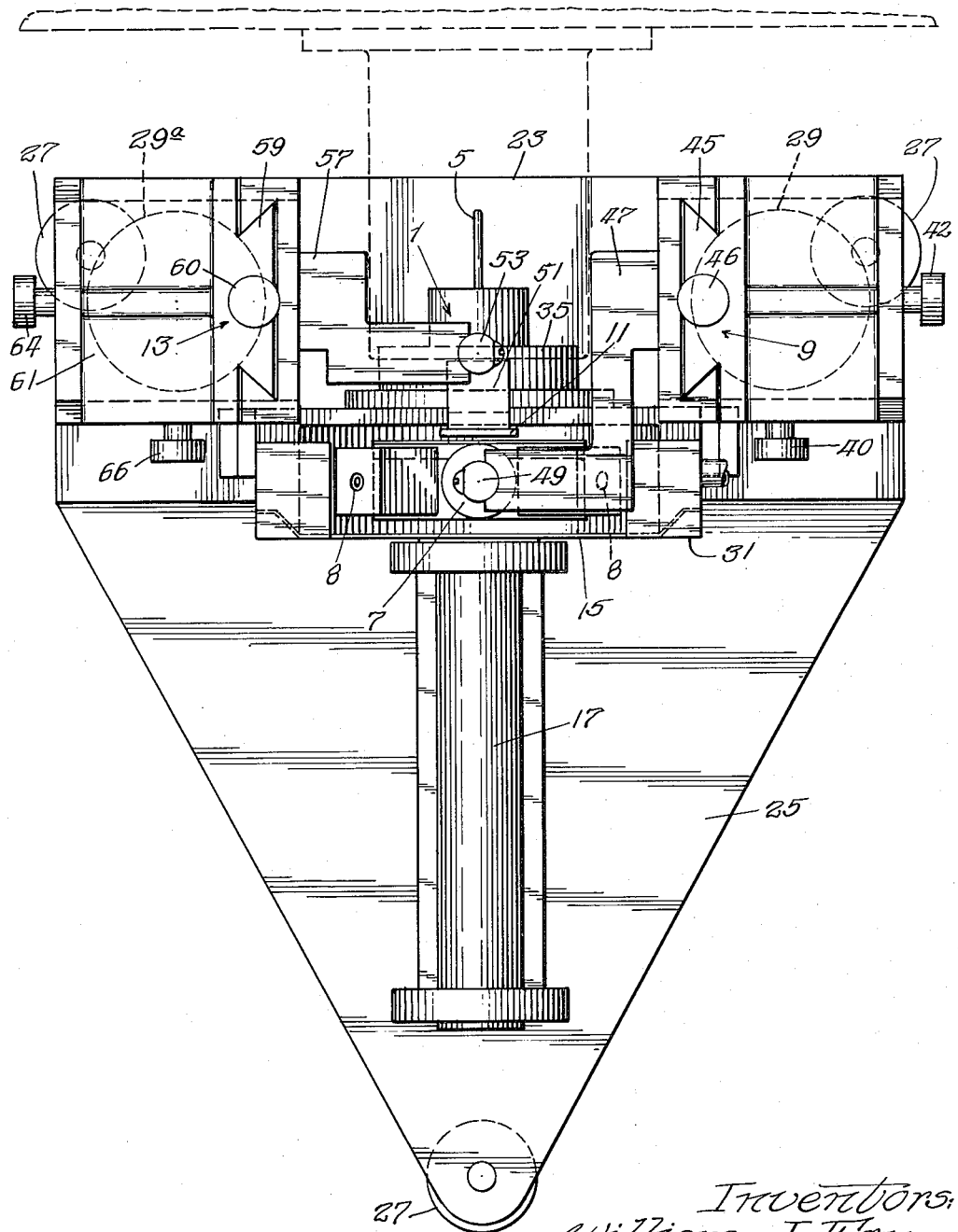

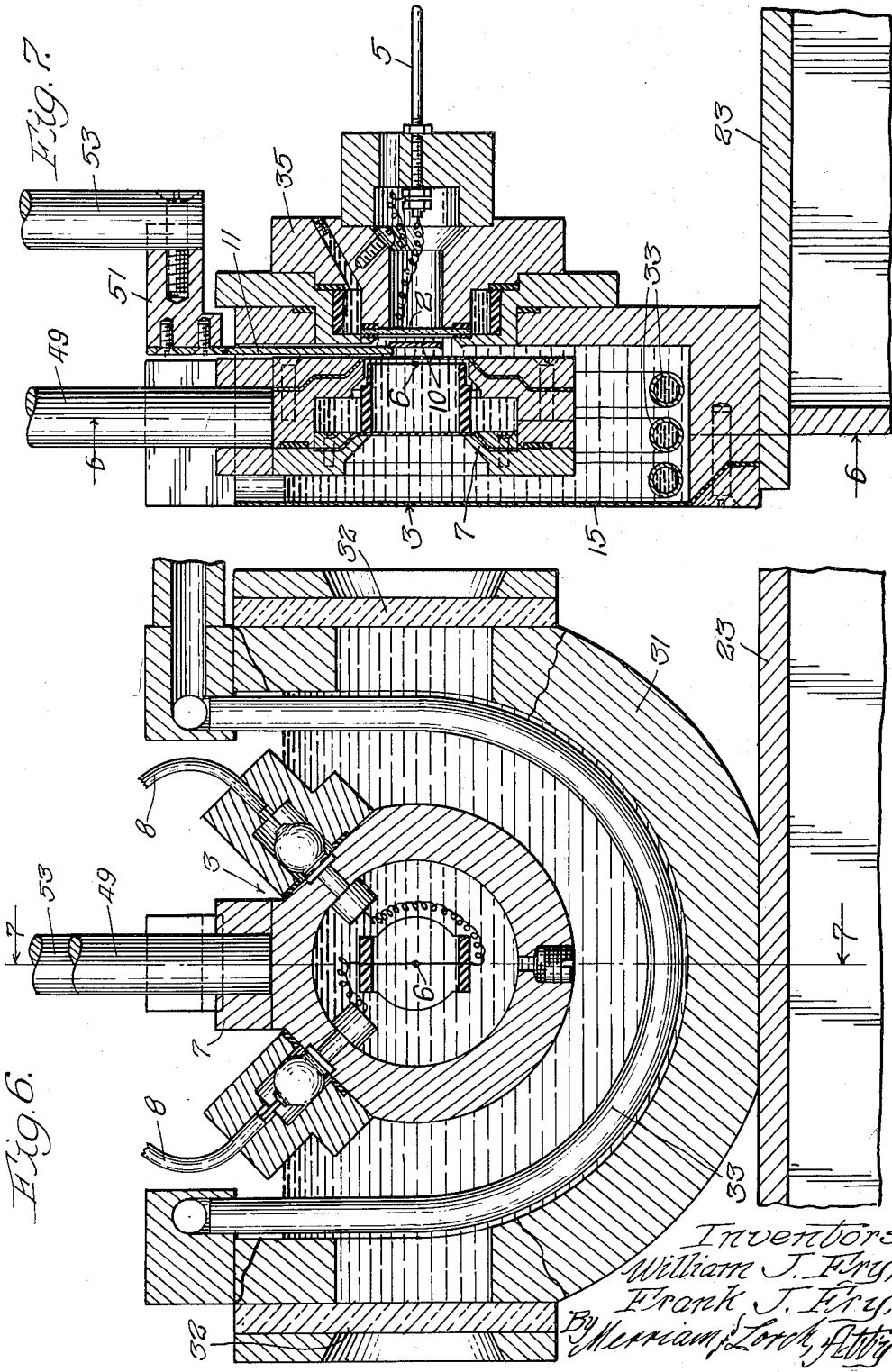

3,024,644
ULTRASONIC MICROSCOPE
William J. Fry and Frank J. Fry, Champaign, Ill., assignors to University of Illinois Foundation
Filed Jan. 16, 1957, Ser. No. 634,517
14 Claims. (Cl. 73—67.5)

This invention relates to an ultrasonic microscope particularly suitable for revealing biological micro structure of a specimen such as for example a tissue slice.

Heretofore, optical and electron microscopes utilizing focusing systems in their design have been available. Such instruments however are limited in their resolution by the wave length of the light in the case of the optical microscope and by the wave length of the electron in the case of the radiation microscope.

In accordance with this invention the microscope uses unfocused acoustic radiation and its resolution is limited by the size of the detecting probe, such as a thermocouple junction. Such a microscope can function either on an absorption principle or on a phase shift principle. In general the microscope may include as the source of acoustic energy a piezo electric crystal, such as an X-cut quartz crystal, excited to vibrate in its thickness mode at an harmonic and producing short acoustic pulses. A thermocouple detecting probe or an array of such probes is fixed relative to the crystal at a short distance away from the crystal. The specimen to be examined is placed between the crystal and the probe and is moved in a plane parallel to the face of the crystal, i.e. perpendicular to the beam. The acoustic pulses are picked up by the probe detector as the specimen is moved, i.e. a varying acoustic signal is picked up at the probe or probes. As the specimen moves between the crystal and detector varying amounts of acoustic energy are absorbed by the specimen in different regions as a result of its structure and a varying acoustic signal is picked up by the detector. Therefore, any motion of the specimen yields a profile of the structure of the specimen as seen ultrasonically.

If the microscope functions on the absorption principle the foregoing arrangement is sufficient because the probe detector receives various amounts of acoustic radiation depending upon the variation in the acoustic absorption coefficient of the specimen as a function of the position of the specimen. In order to realize a "plane picture" of the specimen a linear array of probes may be employed and the specimen is moved in a direction at right angles to the line of the array.

If the microscope is designed to function on the phase principle the ultrasonic waves which pass through the specimen are combined with another wave which does not pass through the specimen. The interference pattern obtained from the combination of these two wave trains results in temperature changes at the thermocouple probes which depend upon the pressure amplitude at the probes. The pressure amplitude of the combined wave train is a result of the summation of the pressure amplitudes of the individual wave trains. The temperature changes at the thermocouple probes can be indicated by any suitable means for either visual or other recordation.

A more complete understanding of this invention will be obtained from the following detailed description given in connection with the drawings, in which:

FIG. 1 is a schematic diagram of an ultrasonic microscope of this invention;

FIG. 2 is a block diagram of a complete circuit and system;

FIG. 3 is a front elevation of an ultrasonic microscope constructed in accordance with the invention;

FIG. 4 is a side elevation of the same;

FIG. 5 is a top plan view;

FIG. 6 is a section along line 6—6 of FIG. 7; and

FIG. 7 is a section along line 7—7 of FIG. 6.

Referring more particularly to FIG. 1 which is a schematic diagram of an ultrasonic microscope constructed in accordance with this invention it will be seen that there is indicated a source 1 of high frequency sound, such as a piezo electric crystal 2, mounted within the chamber 3 which is filled with a de-gassed water or other appropriate liquid. The crystal may be connected by leads 5 to any suitable source of energy such as an electronic driver for causing the crystal to produce a pulse of short duration such as of the order of a millisecond. The pulse should be sufficiently short so that a complete picture of the specimen can be obtained in a period of time such that it can be recorded visually or otherwise. The duration of the pulse must be long enough to produce a sufficient temperature change in the thermocouple junctions or probes 6.

Preferably the probes are mounted in a housing 7 with external leads 8 for connecting to a pickup system and are positioned by a coordinate system 9, having three coordinate movements, two horizontal and one vertical, illustrated only diagrammatically in FIG. 1 and more fully in FIGS. 3, 4, and 5. Any suitable coordinate system may be employed. The probe, although adjustable, is fixed during irradiation.

The sound beam emanating from crystal 2 passes through a specimen 10 in a support 11 also suspended from a coordinate system 13 which preferably provides for three coordinate movements of the specimen. Again, any suitable coordinate system may be used.

It is also desirable to provide a light transparent window 15 into the chamber 3 so that a light microscope 17 for optically viewing the positioning and alignment of the specimen may be used simultaneously with the detector for comparative purposes.

Preferably an array of probes 6 is used instead of a single thermocouple so that successive acoustical readings may be taken.

A detecting probe or thermocouple, satisfactory for the foregoing purposes, is disclosed and its operation explained in U.S. Letters Patent No. 2,986,227 dated May 30, 1961, and granted in the name of William J. Fry. If an array of probes is desired, an array of junctions instead of a single junction is used. In the present instance the thermocouples may be connected to a television screen in order to give a visual pattern if such an indication is desired. In such an indication the strength of the acoustic signal at the probe will determine the brightness of the image. An ultrasound beam for example in the frequency range of 100 mc./s. to 1000 mc./s. may be used.

A field of ultrasonic absorption spectroscopy of biological tissues may be initiated by the realization of this instrument. The determination of the acoustic absorption coefficient of microscopic components of biological systems as a function of the frequency will yield additional information from which to deduce the structure of these components. One would expect that pathological components of tissue would have different values for the acoustic absorption coefficient than that characterizing normal tissue. It is possible that this technique might prove useful in the demonstration and study of early pathological changes in tissue.

The temperature of the fluid in chamber 3 may be and preferably should be controlled by suitable automatic controls which enable the operator to hold the temperature of the sample, ultrasonic source, and detector array at any desired value.

Referring now more particularly to FIG. 2 there is illustrated diagrammatically in block form a complete ultrasonic microscope system constructed and arranged in accordance with this invention. As previously described, the specimen support 11 is disposed between the ultrasonic source and the detector or detector array. The ultrasonic source is derived from the electronic driver amplifier which is supplied from a signal generator to which is attached a frequency meter and is coupled to the ultrasonic microscope unit. The signal generator is connected to a pulsing unit having the usual controls (not shown) for regulating the pulse repetition rate and width. The pulsing unit is under control of a timer which is synchronized with the sample support by the sample moving unit, or a coordinate positioning device.

The ultrasonic source, specimen support, and detector array are under control of a temperature control unit.

The detector array is connected to a pickup system and then to a signal amplification unit which, in turn, is under control of a control timer, which can be any suitable mechanical synchronizing system and the amplification unit then feeds a presentation system, such as a picture device or other display or recording unit; the latter also being under control of the control timer. In this manner all of the necessary units are synchronized by the control timer. In other words, the signal control timing unit synchronizes the acoustic pulses, sample mover, signal amplification unit, and the picture display unit, or other indicating device.

The signal amplification unit may consist of a series of amplifiers, one for each probe if an array is used. The outputs of these amplifiers are used to vary the intensity of the spot of light on the picture display unit.

The schematic illustration of FIG. 2 is presented to exemplify the broad nature of the control, as above stated. The various components thereby set forth are each, as is clearly suggested above, of known character and constitute well-known devices of the prior art when the components are individually used. The signal generator is preferably a precision source of radio or high frequency voltage of the type generally used for test equipment, particularly for calibration in receiver installations. Various commercially available signal generators may be used, such as, for instance, those shown on page 1298 of "Radiotron Designer's Handbook," published in 1953 by the Victor Division of Radio Corporation of America, or they may be as shown at page 737 of the publication of Electronics Training Staff of Harvard Cruft Laboratory, entitled "Electronic Circuits and Tubes," published by McGraw-Hill Book Company, Inc., New York, 1947. Further, a suitable generator for such use which is commercially available on the market may be that which is sold under the trade designation "Model 80R" by the Measurements Corporation.

The pulsing unit shown for controlling the signal generator of FIG. 2, as above suggested, is a device for modulating the output of the signal generator to produce pulses of radio or high frequency power, as required. The pulses obviously may be produced in various ways, such as by mechanical or electronic switches. The mechanical switching type of instrument may be driven from a magnetic drum recorder designed to record the pickup energy from one or a plurality of probes so that the determined information may be recorded as a multiplicity of records. An instrument of this type employs the normal transducers synchronized with the scanning of the presentation device. In this way, as the pickups scan the specimen, the information on the record is continually erased and re-corded to correspond to any indicated structural or characteristic changes in the specimen.

Where electronic switching is provided, a suitable timing or trigger device is utilized to operate the switch which may be operated under the control of the mechanical synchronizing system so as to produce the trigger or timing pulses. In the alternative, accurate timing may be provided by a vacuum tube-driven fork, with the timing pulse used to operate a preset counter which, in turn, operates the electronic switch so that the radio or high frequency voltage from the signal generator is appropriately modulated prior to being supplied as the input voltage to the driver amplifier. Such an electronic switch is disclosed, for instance, in the above-mentioned text "Electronic Circuits and Tubes" at page 835.

The driver amplifier, naturally, would be of a more or less precision type radio frequency power amplifier, operating "Class A" and, for example, could be of a type disclosed by Professor Terman in his "Radio Engineers' Handbook," published by McGraw-Hill Book Company, New York, 1943 on page 429. Such amplifiers are also readily available on the open market and illustrative of such types are those manufactured by Hewlett-Packard and known as the model 460-A.

The frequency meter is a device for accurately determining the frequency output of the signal generator. Many items of this type are commercially available but one of which is that known as the Model BC–221–D, manufactured by the Allen D. Cardwell Manufacturing Corporation.

A suitable coupling unit is preferably provided in the form of a radio frequency transformer of a type well-known and illustrated, for instance, by the Terman text, above named, at page 162. A couple of this character is used to match the output impedance of the driver amplifier to the transducer element of the ultrasonic microscope unit of the type disclosed, for instance, by the above-mentioned U.S. patent application of William J. Fry, Serial No. 505,365.

The pickup system is composed of one or more transducers which convert the transmitted acoustical energy into electrical energy. Such probes, for example are clearly described in the disclosures of the present applicant William J. Fry jointly with Ruth B. Fry, and set forth in the "Journal of Acoustical Society of America," volume 26, and incorporated in the material between pages 294 and 317 of the 1954 volume.

The amplifier connected to the output of the pickup system naturaly has a relatively low noise level because the output of the thermocouple is of small voltage in the micro-volt or even in the sub-micro-volt region. Many commercial amplifiers have these characteristics and approach the theoretical limit, although the amplifier need not generally have a D.C. response but should be somewhat lower than the pulse period. A suitable amplifier of this characteristic is shown by the "Handbook of Industrial Electronic Control Circuits," at page 50, this publication having been made by Messrs. Markus & Zeluff and published by McGraw-Hill book Company, Inc., New York, in 1946, although the well-known Liston-Becker amplifier, commercially available, is also a satisfactory component.

The synchronizing system depicted takes the amplified output of the pickup system and feeds the information to the presentation system in a fashion to reconstruct the spatial relationship of the specimen. The presentation may be made by a two-dimensional array of pickup probes or a linear array of pickup probes, working through a similar number of amplifiers and may or may not be recorded as above-mentioned. Also, the presentation may be made by a well-known type of cathode-ray tube in which the spot is caused to sweep across the tube in a series of parallel lines so as to cover the tube face and provide a scanned raster in which the ultrasonic transmission information becomes available as a brightness variation corresponding to or designating the acoustical absorption within the sample.

FIGS. 3, 4, 5, 6, and 7 illustrate one practical embodiment of an ultrasonic microscope unit embodied in this invention. This unit is adapted to be mounted upon a support or table 21 and is carried upon a base 23 having a lateral extension 25 and may be adjusted or levelled with respect to the table by means of thumb screws 27. Rising vertically from the base are two rigid cylindrical pillars or standards 29 and 29a which support the coordinate systems 9 and 13 of both the specimen holder 11 and the probe 6. Both the specimen holder and the probe, or an array of probes if an array is used, project into the chamber 3 of a housing 31 which rests upon the base and is fluid tight to retain a degasified liquid into which the specimen holder, probe, and crystal are immersed. For convenience one face of the housing is preferably closed by a plate 15 made of some transparent material to permit visual observation of the interior of the housing and also to permit positioning and utilization of a light microscope 17 through this face for simultaneous optical observation during radiation of ultrasonic sound. Preferably the circumferential wall of the housing is also provided with windows 32 on each side to admit light and to permit optical observation therethrough. Heat transfer coils 33, supplied from any suitable controlled source (not shown) are also preferably placed within the housing in order to maintain a constant temperature of the liquid in the housing and consequently of the specimen holder and the probe. The crystal 2, mounted in a suitable holder 35, is secured to the opposite face of the housing with the crystal projecting through and sealed within an opening in the face in any suitable manner as shown more particularly in FIG. 7.

In order that both the specimen holder and the probe, or array of probes, may each be moved in the three coordinate directions, that is two horizontal and one vertical, at least one movement of each being normal to the path of the ultrasonic sound beam, each is supported from one of the standards 29 and 29a. Standard 29 has at its top a plate 37 having a horizontal guideway 39 permitting horizontal movement in one direction under control of a thumb screw 40, which guideway also carries a second guideway 41 permitting horizontal movement in a direction perpendicular to the first mentioned movement under control of a thumb screw 42. Guideway 41 supports a pedestal 43 which carries a third guideway 45 providing for vertical sliding movement under control of a third thumb screw 46 of an arm 47 supporting a vertical post 49 which depends downwardly toward the housing and carries on its lower end the probe or detector 6 well within the housing so as to be completely submerged in the liquid within the housing and in the direct path of ultrasonic sound radiated from a high frequency sound source illustrated as a piezo electric crystal 2.

The specimen 10 to be observed is mounted in the specimen support 11 and is positioned between the crystal 2 and the detector 6, carried by the depending arm 51 secured to the lower end of a rod 53 the upper end of which is attached to an arm 57 extending outwardly from a vertical slide 59 similar to slide 45. Vertical movement is under control of a thumb screw 60. Slide 59 is secured to a pedestal 61 upon a horizontal guideway 63 permitting horizontal movement under control of a second thumb screw 64. Guideway 63 is mounted upon a second horizontal guideway 65 which permits a second horizontal movement under control of a third thumb screw 66. Guideway 65 is mounted upon a plate 67 on top of standard 29a. Thus the specimen support 11 like the detector 6 is mounted for the three coordinate movements, that is two horizontal movements and one vertical movement, one horizontal movement being normal to the path of the radiated sound.

Obviously changes may be made in the details of construction and also in the standard or commercial unit employed in the system without departing from the spirit and scope of the invention as defined in the appended claims.

We claim:

1. In an ultrasonic microscope, means for producing an ultrasonic sound beam, means for supporting a specimen to be examined in the path of said beam, a thermo-couple probe detector in close proximity to the specimen in the path of said beam immediately after it leaves said specimen so that the instantaneously produced detected indication shall represent the absorption of the ultrasonic sound beam in the portion of the specimen between the sound producing means and the probe, means for exposing the specimen to be examined to excitation by the ultrasonic sound beam for a period of the order of about one millisecond thereby to produce a change in the temperature of the thermo-couple probe sufficient to be measured, and means for indicating the signal picked up by the said thermocouple probe detector.

2. In an ultrasonic microscope as defined in claim 1; said detector being a linear array of detectors.

3. In an ultrasonic microscope as defined in claim 1; additional means for mounting the specimen and the detector to provide for moving said specimen relative to the detector in a direction at right angles to the path of the beam.

4. In an ultrasonic microscope as defined in claim 1; additional means for mounting the specimen and the detector to provide for moving said detector relative to the specimen in a direction at right angles to the path of said beam.

5. In an ultrasonic microscope as defined in claim 1; additional means whereby the specimen is mounted for movement in a direction at right angles to the path of said beam to produce a response from said detector.

6. In an ultrasonic microscope system, a source of ultrasonic sound; a thermo-couple probe detector in the path of said sound; a specimen support in said path between said source and said detector and movable in a direction normal to the path of said sound; the thermo-couple probe detector being positioned in close proximity to the supported specimen so that the instantly produced indications shall be representative of the ultrasonic sound absorption of the portion of the specimen between the sound source and the thermo-couple probe detector; a driver amplifier connected to said source; a signal generator feeding said driver amplifier; a pulsing unit connected to said generator; a pickup amplifier and presentation means connected to said pickup; and a signal control unit for synchronizing the acoustic pulses, specimen movement, signal amplification, and presentation means.

7. In an ultrasonic microscope as defined in claim 6 wherein said detector consists of an array of detectors in the path of said sound.

8. In an ultrasonic microscope system as defined in claim 6 wherein said detector is movable in a path normal to the path of said sound.

9. In an ultrasonic microscope system as defined in claim 7 wherein said array of detectors is movable in a path normal to the path of said sound.

10. An ultrasonic microscope system as defined in claim 6 comprising, in addition, a housing for enclosing the source of ultrasonic sound, the specimen support and the thermo-couple probe detector and means for maintaining the interior of said housing at a constant temperature.

11. In an ultrasonic microscope apparatus as defined in claim 1 having support means for mounting the specimen and means for moving said specimen support in a direction normal to the path of said beam.

12. In an ultrasonic microscope system as defined in claim 6 comprising, in addition, a fluid-tight housing adapted to be opened on one side, the said housing being adapted to contain the ultrasonic sound source, the detector and the specimen support.

13. In an ultrasonic microscope system as defined in claim 12 wherein the said housing opening is adapted for the reception of a source of ultrasonic sound.

14. In an ultrasonic microscope system as defined in claim 12 wherein the said housing has one transparent portion for the reception of an optical microscope.

(References on following page)

References Cited in the file of this patent

UNITED STATES PATENTS

| | | |
|---|---|---|
| 2,164,125 | Sokoloff | June 27, 1939 |
| 2,278,241 | Case | Mar. 31, 1942 |
| 2,378,237 | Morris | June 12, 1945 |
| 2,461,543 | Gunn | Feb. 15, 1949 |
| 2,593,865 | Erdman | Apr. 22, 1952 |
| 2,618,968 | McConnell | Nov. 25, 1952 |
| 2,700,895 | Carson | Feb. 1, 1955 |

FOREIGN PATENTS

| | | |
|---|---|---|
| 541,959 | Great Britain | Dec. 19, 1941 |
| 170,212 | Austria | Jan. 25, 1952 |
| 696,920 | Great Britain | Sept. 9, 1953 |

OTHER REFERENCES

Palmer: "Journal of Scientific Instruments," vol. 30, June 1953, pp. 177–179.